United States Patent
Panchal et al.

(10) Patent No.: US 9,022,141 B2
(45) Date of Patent: May 5, 2015

(54) DIRECTIONAL DRILLING ATTITUDE HOLD CONTROLLER

(71) Applicant: Schlumberger Technology Corporation, Sugar Land, TX (US)

(72) Inventors: Neilkunal Panchal, London (GB); Martin Bayliss, Gloucestershire (GB); James Whidborne, Keynes (GB); Wayne J. Phillips, Houston, TX (US)

(73) Assignee: Schlumberger Technology Corporation, Sugal Land, TX (US)

( * ) Notice: Subject to any disclaimer, the term of this patent is extended or adjusted under 35 U.S.C. 154(b) by 248 days.

(21) Appl. No.: 13/682,528

(22) Filed: Nov. 20, 2012

(65) Prior Publication Data
US 2013/0126239 A1    May 23, 2013

Related U.S. Application Data

(60) Provisional application No. 61/561,930, filed on Nov. 20, 2011.

(51) Int. Cl.
  E21B 44/00    (2006.01)
  E21B 7/04     (2006.01)
  E21B 47/024   (2006.01)

(52) U.S. Cl.
  CPC  *E21B 7/04* (2013.01); *E21B 47/024* (2013.01)

(58) Field of Classification Search
  CPC ......... E21B 7/04; E21B 47/024; E21B 7/068; E21B 7/08; E21B 47/002
  USPC ................... 175/24, 61, 73, 40, 45, 76; 702/9
  See application file for complete search history.

(56) References Cited

U.S. PATENT DOCUMENTS

| | | | |
|---|---|---|---|
| 4,639,898 A | 1/1987 | Sauer |
| 5,113,953 A | 5/1992 | Noble |
| 5,265,682 A | 11/1993 | Russel et al. |
| 5,520,255 A | 5/1996 | Barr et al. |
| 5,553,678 A | 9/1996 | Barr et al. |
| 5,553,679 A | 9/1996 | Thorp |

(Continued)

FOREIGN PATENT DOCUMENTS

EP    0286682    10/1988

OTHER PUBLICATIONS

Examination Report for the equivalent GB patent application No. 1220841.9 issued on Feb. 14, 2013.

(Continued)

*Primary Examiner* — Yong-Suk (Philip) Ro
(74) *Attorney, Agent, or Firm* — Chadwick A. Sullivan; Wesley Noah

(57) ABSTRACT

An attitude hold controller method includes receiving at a navigable apparatus a demand inclination and a demand azimuth with respect to a global coordinate system and determining at the navigable apparatus a demand attitude vector according to the received demand inclination and the demand azimuth. Determining at the navigable apparatus a current navigable apparatus attitude vector. Evaluating a control law using the current navigable apparatus vector and the navigable apparatus demand attitude to derive a control law tool face, converting the control law tool face to an equivalent tool face, and applying the equivalent tool face with the navigable apparatus to control the navigable apparatus attitude.

20 Claims, 5 Drawing Sheets

(56) References Cited

U.S. PATENT DOCUMENTS

| | | |
|---|---|---|
| 5,582,259 A | 12/1996 | Barr |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,706,905 A | 1/1998 | Barr |
| 5,778,992 A | 7/1998 | Fuller |
| 5,803,185 A | 9/1998 | Barr et al. |
| 5,971,085 A | 10/1999 | Colebrook |
| 6,089,332 A | 7/2000 | Barr et al. |
| 6,092,610 A | 7/2000 | Kosmale et al. |
| 6,158,529 A | 12/2000 | Dorel |
| 6,244,361 B1 | 6/2001 | Comeau et al. |
| 6,364,034 B1 | 4/2002 | Schoeffler |
| 6,381,858 B1 | 5/2002 | Shirasaka |
| 6,394,193 B1 | 5/2002 | Askew |
| 6,464,021 B1 | 10/2002 | Edwards |
| 6,601,658 B1 | 8/2003 | Downton |
| 7,136,795 B2 | 11/2006 | Downton |
| 7,669,669 B2 | 3/2010 | Downton et al. |
| 7,751,280 B2 | 7/2010 | Denichou et al. |
| 7,957,946 B2 | 6/2011 | Pirovolou |
| 8,061,444 B2 | 11/2011 | Mullins et al. |
| 8,301,382 B2 | 10/2012 | Herrera |
| 2001/0052428 A1 | 12/2001 | Larronde et al. |
| 2002/0011359 A1 | 1/2002 | Webb et al. |
| 2007/0029112 A1 | 2/2007 | Li et al. |
| 2007/0221375 A1 * | 9/2007 | Baron et al. ............... 166/255.2 |
| 2010/0175922 A1 | 7/2010 | Ignova et al. |
| 2010/0185395 A1 | 7/2010 | Pirovolou et al. |
| 2011/0213601 A1 | 9/2011 | Pirovolou |
| 2012/0046868 A1 | 2/2012 | Tchakarov et al. |
| 2013/0126239 A1 | 5/2013 | Panchal et al. |

OTHER PUBLICATIONS

"Attitude Control System for Directional Drilling Bottom Hole Assemblies" by Panchal, N.; Bayliss, M.T.; Whidborne, J. F.; Control Theory & Applications, IET, vol. 6, Issue 7, published May 3, 2012.

* cited by examiner

DIRECTIONAL DRILLING ATTITUDE HOLD CONTROLLER

BACKGROUND

This section provides background information to facilitate a better understanding of the various aspects of the disclosure. It should be understood that the statements in this section of this document are to be read in this light, and not as admissions of prior art.

In underground drilling, a drill bit is used to drill a borehole into subterranean formations. The drill bit is attached to sections of pipe that stretch back to the surface. The attached sections of pipe are called the "drill string." The section of the drill string that is located near the bottom of the borehole is called the "bottom hole assembly" ("BHA"). The BHA typically includes the drill bit, sensors, batteries, telemetry devices, and various other equipment located near the drill bit. A drilling fluid, called "mud," is pumped from the surface to the drill bit through the pipe that forms the drill string. The primary functions of the mud are to cool the drill bit and carry drill cuttings away from the bottom of the borehole and up through the annulus between the drill pipe and the borehole.

Because of the high cost of setting up drilling rigs and equipment, it is desirable to be able to explore formations other than those located directly below the drilling rig, without having to move the rig or set up another rig. In off-shore drilling applications, the expense of drilling platforms makes directional drilling even more desirable. "Directional drilling" refers to the intentional deviation of a wellbore from a vertical path. A driller can drill to an underground target by pointing the drill bit in a desired drilling direction.

SUMMARY

A method according to an embodiment of an attitude hold controller includes sending attitude reference data to a controller disposed with a drilling tool and converting the attitude reference data into a vector unit in vector space representing a drill attitude. A control law is instituted to stabilize the drill attitude and to drive the drill attitude to a set point. A coordinate transformation may be performed to implement a controller, and the attitude of the drilling tool is controlled in response to implementing the controller. According to an embodiment, attitude data representing the current drilling tool attitude is sent to the controller. In accordance with an embodiment, controlling the drilling tool attitude includes sending a steering direction to the drilling tool.

According to one or more embodiments, a method includes receiving at a navigable apparatus a demand inclination and a demand azimuth with respect to a global coordinate system and determining at the navigable apparatus a demand attitude vector according to the received demand inclination and the demand azimuth. Determining at the navigable apparatus a current navigable apparatus attitude vector. Evaluating a control law using the current navigable apparatus vector and the navigable apparatus demand attitude to derive a control law tool face, converting the control law tool face to an equivalent tool face, and applying the equivalent tool face with the navigable apparatus to control the navigable apparatus.

In accordance to one or more embodiments, a method includes determining at a drilling tool a demand attitude and a current drilling tool attitude. Evaluating a control law using the current drilling tool attitude and the drilling tool demand attitude to derive a control law tool face. Converting the control law tool face to an equivalent tool face and applying the equivalent tool face with the drilling tool to control the drilling tool attitude.

The foregoing has outlined some of the features in order that the detailed description of directional drilling attitude hold controller embodiments that follows may be better understood. Additional features and advantages of the directional drilling attitude hold controller will be described hereinafter which form the subject of the claims of the invention. This summary is not intended to identify key or essential features of the claimed subject matter, nor is it intended to be used as an aid in limiting the scope of claimed subject matter.

BRIEF DESCRIPTION OF THE DRAWINGS

Embodiments of directional drilling attitude hold controller devices, systems, and methods are described with reference to the following figures. The same numbers are used throughout the figures to reference like features and components. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
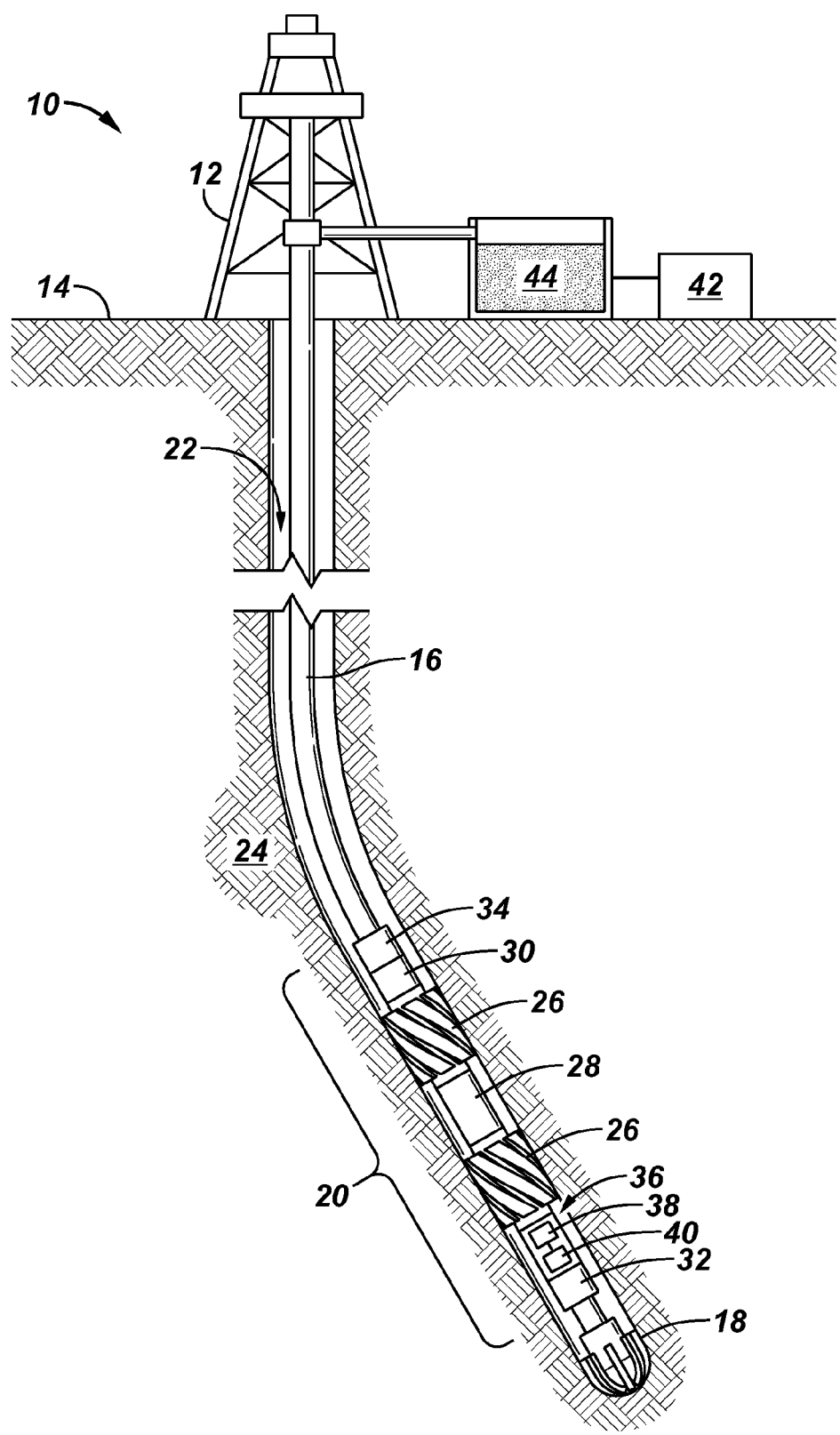
FIG. 1 is a pictorial diagram of a directional drilling system in which embodiments of directional drilling attitude hold controllers can be implemented.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

The directional drilling process creates geometric boreholes by steering a drilling tool along a planned path. A directional drilling system utilizes a steering assembly to steer the drill bit and to create the borehole along the desired path (i.e., trajectory). Steering assemblies may be classified generally, for example, as a push-the-bit or point-the-bit devices. Push-the-bit devices apply a side force on the formation to influence the change in orientation. A point-the-bit device is when the bottom hole assembly has a fixed bend in the geometry. Rotary steerable systems ("RSS") provide the ability to change the direction of the propagation of the drill string and borehole while drilling.

According to embodiments, control systems may be incorporated into the downhole system to stabilize the orientation of propagation of the borehole and to interface directly with the downhole sensors and actuators. For example, directional drilling devices (e.g., RSS and non-RSS devices) may be incorporated into the bottom hole assembly. Directional drilling may be positioned directly behind the drill bit in the drill string. According to one or more embodiments, directional drilling devices may include a control unit and bias unit. The control unit may include, for example, sensors in the form of accelerometers and magnetometers to determine the orientation of the tool and the propagating borehole, and processing and memory devices. The accelerometers and magnetometers may be referred to generally as measurement-while-drilling sensors. The bias unit may be referred to as the main actuation portion of the directional drilling tool and the bias unit may be categorized as a push-the-bit or point-the-bit actuators. The drilling tool may include a power generation device, for example, a turbine to convert the downhole flow of drilling fluid into electrical power.

Push-the-bit steering devices apply a side force to the formation through a stabilizer for example. This provides a lateral bias on the drill bit through bending in the borehole. Push-the-bit steering devices may include for example actuator pads. According to one embodiment, a motor in the control unit rotates a rotary valve that directs a portion of the flow of drilling fluid into piston chambers. The differential pressure between the pressurized piston chambers and the formation applies a force across the area of the pad to the formation. A rotary valve, for example, may direct the fluid flow into a piston chamber to operate a pad and create the desired side force. In these systems, the tool may be continuously steering.

Point-the-bit steering devices are ones in which the axis of the drill bit is at an angular offset to the axis of the bottom hole assembly. For example, the outer housing and the drill bit may be rotated from the surface and a motor may rotate in the opposite direction from the outer housing. A power generating device (e.g., turbine) may be disposed in the drilling fluid flow to generate electrical power to drive a motor. The control unit may be located behind the motor, with sensors that measure the attitude and control the tool face angle of the fixed bend.

FIG. 1 is a schematic illustration of an embodiment of a directional drilling system, generally denoted by the numeral 10, in which embodiments of navigation, e.g., directional drilling, attitude hold control may be incorporated. Directional drilling system 10 includes a rig 12 located a surface 14 and a drill string 16 suspended from rig 12. A drill bit 18 disposed with a bottom hole assembly ("BHA") 20 and deployed on drill string 16 to drill (i.e., propagate) borehole 22 into formation 24. Specific embodiments are illustrated and described herein with reference to drilling systems, however, it is recognized and intended that the devices, systems and methods disclosed are not limited to directional drilling systems but are applicable to various navigable apparatus. For example, and without limitation, embodiments of navigable apparatus include missiles and drones. An example of an attitude control system is discussed in "Attitude Control System for Directional Drilling Bottom Hole Assemblies" by Panchal, N.; Bayliss, M. T.; Whidborne, J. F.; *Control Theory & Applications*, IET, Vol. 6, Issue 7, published 3 May 2012; which is incorporated herein by reference.

The depicted BHA 20 includes one or more stabilizers 26, a measurement-while-drilling ("MWD") module or sub 28, a logging-while-drilling ("LWD") module or sub 30, and a steering device 32 (e.g., RSS device), and a power generation module or sub 34. Directional drilling system 10 includes an attitude hold controller 36 disposed with BHA 20 and operationally connected with steering device 32 to maintain drill bit 18 and BHA 20 on desired drill attitude to propagate borehole 22 along the desired path (i.e., target path). Depicted attitude hold controller 36 includes a downhole processor 38 and direction and inclination ("D&I") sensors 40, for example, accelerometers and magnetometers. According to an embodiment, downhole attitude hold controller 36 is a closed-loop system that interfaces directly with BHA 20 sensors, i.e., D&I sensors 40, MWD sub 28 sensors, and steering device 32 (e.g., actuator) to control the drill attitude. Attitude hold controller 36 may be, for example, a unit configured as a roll stabilized or a strap down control unit. Although embodiments are described primarily with reference to rotary steerable systems, it is recognized that embodiments may be utilized with non-RSS directional drilling tools.

Figure 2:
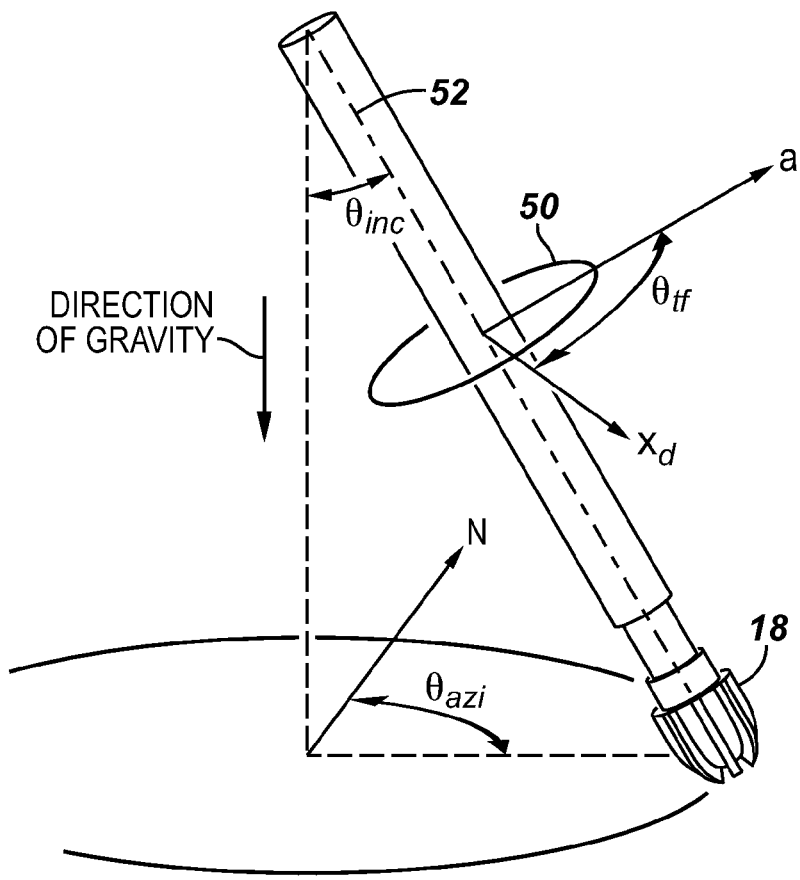
FIG. 2 is a pictorial diagram of attitude and steering parameters depicted in a global coordinate reference frame in accordance with one or more embodiments.
Figure 6:
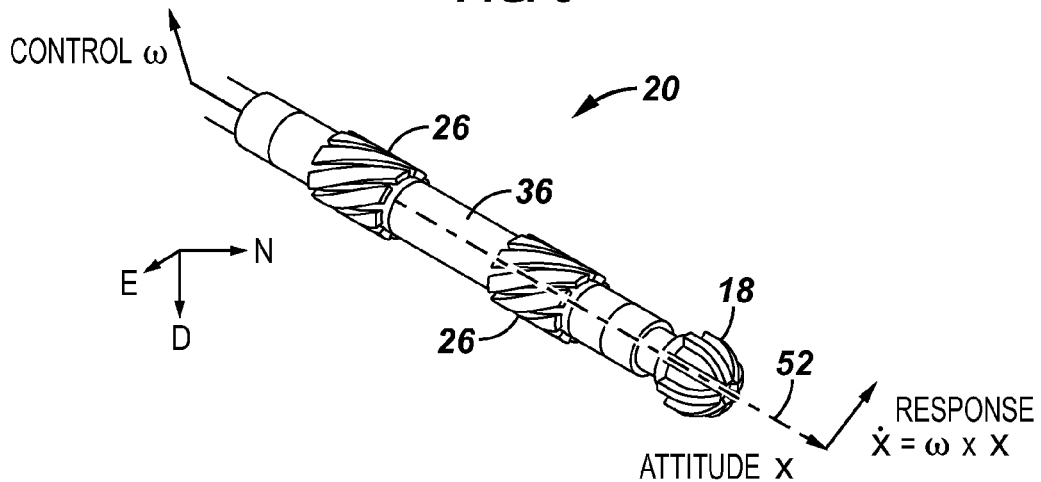
FIG. 6 is a pictorial diagram illustrating a kinematic response mode of a directional drilling tool in accordance with one or more embodiments.
Figure 7:
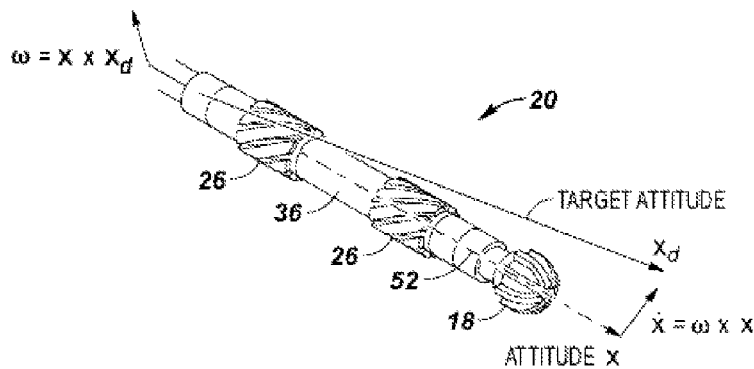
FIG. 7 is a pictorial diagram of a directional drilling tool in accordance to one or more embodiments.

The tool's attitude (e.g., drill attitude) is generally identified as the axis of BHA 20 which is identified by the numeral 52 for example in FIGS. 2, 6 and 7. Attitude commands may be inputted (i.e., transmitted) from a directional driller or trajectory controller generally identified as the surface controller 42 (e.g., processor) in this embodiment. Signals, such as the demand attitude commands, may be transmitted for example via mud pulse telemetry, wired pipe, and wireless transmissions. Accordingly, upon directional inputs from surface controller 42, downhole attitude hold controller 36 controls the propagation of borehole 22 through a downhole closed loop, for example by operating steering device 32. In particular, steering device 32 is actuated to drive the drill to a set point.

In the point-the-bit system, the axis of rotation of the drill bit 18 is deviated from the local axis 52 (e.g., FIGS. 6, 7) of bottom hole assembly 20 in the general direction of the new borehole 22. The borehole is propagated in accordance with the customary three-point geometry defined by upper and lower stabilizer 26 touch points and the drill bit 18 touch point. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953.

In the push-the-bit rotary steerable system there is usually no specially identified mechanism to deviate the drill bit axis from the local bottom hole assembly axis; instead, the requisite non-collinear condition is achieved by causing either or both of the upper or lower stabilizers to apply an eccentric force or displacement in a direction that is preferentially orientated with respect to the direction of the borehole propagation. Again, there are many ways in which this may be achieved, including non-rotating (with respect to the hole)

eccentric stabilizers (displacement based approaches) and eccentric actuators that apply force to the drill bit in the desired steering direction. Again, steering is achieved by creating non co-linearity between the drill bit and at least two other touch points. Examples of push-the-bit type rotary steerable systems and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; and 5,971,085.

Directional drilling system 10 includes drilling fluid or mud 44 that can be circulated from surface 14 through the axial bore of drill string 16 and returned to surface 14 through the annulus between drill string 16 and formation 14.

FIG. 2 illustrates attitude and steering parameters for a bottom hole assembly, identified by axis 52, in a global or Earth reference frame coordinate system. The attitude being the direction of propagation of the drill and represented by a unit vector for the downhole control systems. The tool face is identified by the numeral 50. The global or Earth reference frame is fixed geologically and by convention is a right handed coordinate system with the x-axis pointing downhole and the y-axis pointing magnetically North.

Figure 3:
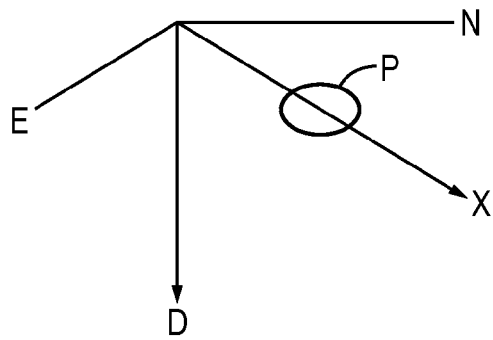
FIG. 3 is a pictorial diagram of a global coordinate reference frame in accordance with one or more embodiments.

Referring now to FIG. 3, a global (North, East, down) coordinate system is depicted. The unit vector "X" represents a target attitude projected onto a plane "P" that is normal to the target attitude. Target attitude "X" is illustrated extending parallel to the borehole "D" at the borehole's instantaneous position. The steering guidance, according to some embodiments, is reduced to providing an angle between the projections of a reference vector chosen by an operator, for example arbitrarily chosen, and a unit vector that represents the target attitude onto the plane "P".

Figure 4:
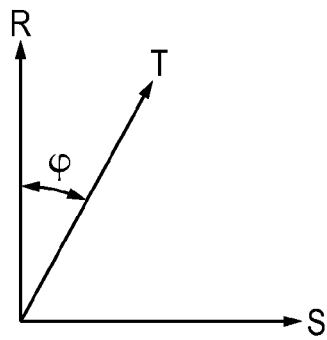
FIG. 4 is a pictorial diagram viewed along an axis of a borehole in a global coordinate reference frame in accordance with one or more embodiments.

FIG. 4 is an illustration viewed along the axis of the borehole "D" of FIG. 3 looking downhole and parallel to target attitude "X" in FIG. 3. Referring to FIG. 4, vectors denoted as "R", "T" and "S" are projected onto plane "P." Vector "R" is a reference vector chosen by an operator. For example, a directional driller may choose the reference as the high side of the borehole. Target vector "T" is the direction in which the drill bit must be pushed in order to reach the target attitude. Vector "S" is cross product of the target vector with the reference vector in this embodiment. Again, viewed along the axis of the borehole downhole and parallel to target "X" in FIG. 3, the vectors R, S and T lie in the plane "P".

In order to steer the drilling tool (e.g., drill bit), the angular displacement between the reference projection "R" and the target projection "T" must be known. The angle displacement between the reference vector "R" and the target vector "T" projected onto the plane P is designated as angle ϕ in the FIGS. 3 and 4.

Figure 5:
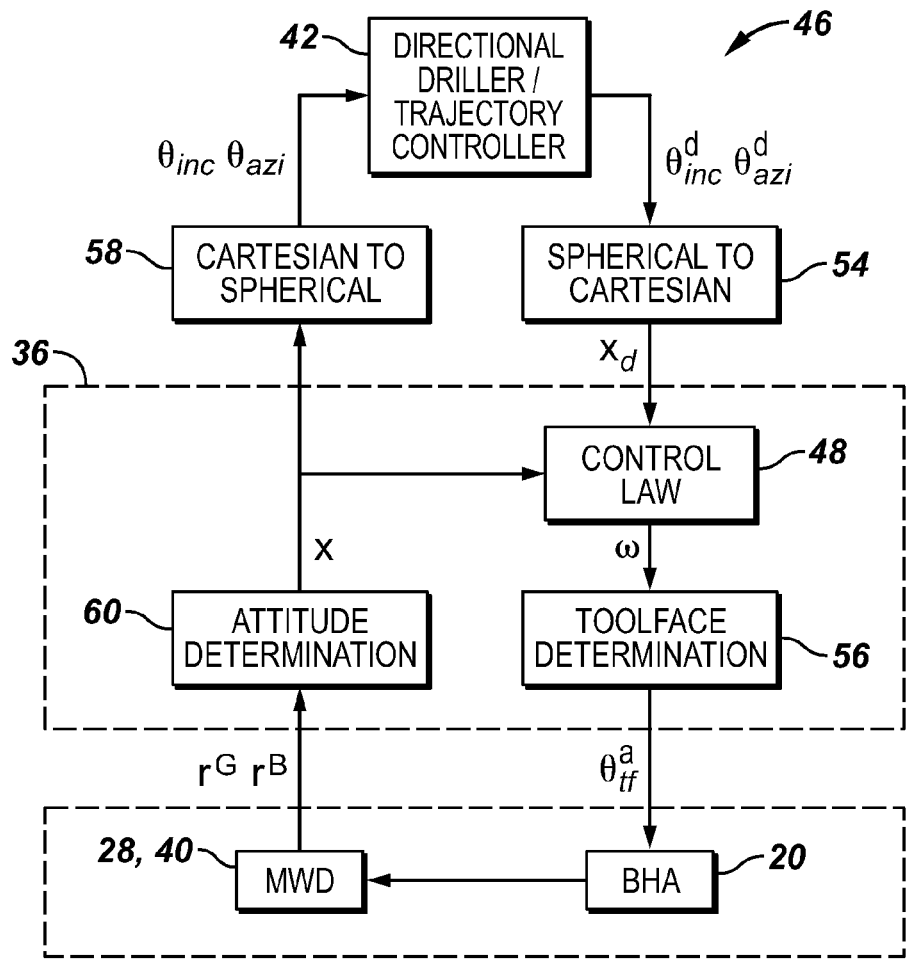
FIG. 5 is a pictorial diagram of a directional drilling attitude hold control in accordance with one or more embodiments.

FIG. 5 illustrates an example of a closed loop directional drilling attitude hold control, generally denoted by the numeral 46, according to one or more embodiments. Closed loop attitude hold control 46 is a system to hold an attitude specified by inclination and azimuth angle set points. The inclination $\theta_{inc}$ and azimuth $\theta_{azi}$ angles are shown in FIG. 2 for example. The data from BHA 20, for example, D&I sensors 40 may be communicated to surface controller 42 (e.g., the direction driller) for example via a low bandwidth (2 to 20 bits per second) mud pulse to identify the instantaneous inclination and azimuth and thus the attitude of BHA 20.

The directional driller (e.g., surface controller 42) communicates attitude reference signals to the downhole attitude hold controller 36 (e.g., processor 38). The reference signals being inclination $\theta_{inc}^d$ (i.e., demand tool inclination) and azimuth $\theta_{azi}^d$ (i.e., demand tool azimuth) set points of a desired tool orientation in the Earth reference frame. These demand inclination and azimuth signals are converted to a unit vector in the $R^3$ vector space, representing a drill attitude. The control law 48 stabilizes an attitude, for example, the drilling tool attitude x (e.g., measured attitude) and drives the attitude toward the set points. According to an embodiment, attitude hold controller 36 recursively actuates tool face 50 (FIG. 2) in the direction of the projection of the target attitude onto a plane at a right angles to the tool's (e.g., BHA 20) downhole axis 52 (FIG. 2). For example, with reference to FIGS. 3 and 4, the tool face is recursively actuated to plane "P" shown in FIG. 3.

FIG. 6 illustrates a kinematic response mode of a BHA 20 (i.e., drilling tool). The kinematic system representing a control law 48 that is a time varying response of the drilling tool's (e.g., BHA 20) attitude x can be represented as $$\dot{x} = \omega \times x \quad \text{(Eq. 1)}$$

where $x \in R^3$ is a unit vector representing the tool's attitude, $\omega \in R^3$ is the angular velocity vector parameter (the magnitude of which is referred to herein as the build rate), and x denotes the vector product operator. FIG. 7 illustrates an example of feedback control laws 48.

Given an initial value, $x(0)=x_0$, $\|x_o\|=1$, and a control $\omega$, the resulting trajectory x(t) lies on the surface of the unit sphere, that is $\|x(t)\|=1$ for all t and $\omega$. The kinematic motion is controlled by varying $\omega$ via the tool face 50 (FIG. 2) angle $\theta_f$. Equation 1 can be expressed as:

$$\dot{x} = Mx \quad \text{(Eq. 2)}$$

where $$M = \begin{bmatrix} 0 & -\omega_3 & \omega_2 \\ \omega_3 & 0 & -\omega_1 \\ -\omega_2 & \omega_1 & 0 \end{bmatrix} \text{ and } \omega = \begin{matrix} \omega_1 \\ \omega_2 \\ \omega_3 \end{matrix} \quad \text{(Eq. 3)}$$

According to an embodiment of attitude hold control 46, assuming a drilling tool 20 with a variable build-rate k (i.e., rate of change of attitude with respect to time). The dynamic system given by (Eq. 1) with a feedback control law 48

$$\omega = kx \times x_d \quad \text{(Eq. 4)}$$

is locally asymptotically stable at the equilibrium point $x=x_d$ for $x \in B$, for all $k \in R+\backslash\{0\}$ where $x_d \in R^3$ is the demand attitude of the tool, and where $$B := \{x : \|x\|=1 \text{ and } x \in R^3 \text{ and } x \neq -x_d\} \quad \text{(Eq. 5)}$$

For the tool to converge towards its demand attitude $x_d$, this must be the equilibrium point. The neighborhood B around the equilibrium point is defined to be the set of all attitudes x such that $x \neq x_d$. This embodiment of control law 48 is linear and avoids the non-linearities associated with Euler angle representations.

According to an embodiment of closed loop attitude hold control 46, the tool build rate is generally nominally constant, accordingly, an embodiment of control law 48 assumes a constant, or zero, build-rate K. The dynamic system given by (Eq. 1) with a feedback control law 48

$$\omega = \begin{cases} K \dfrac{x \times x_d}{\|x \times x_d\|} & \text{for } x \neq x_d \\ 0 & \text{for } x = x_{d1} \end{cases} \quad \text{(Eq. 6)}$$

is locally asymptotically stable at the equilibrium point $x=x_d$ for $x \in B$ where K is the constant build rate.

According to an embodiment of an attitude hold control 46, assuming a tool with a constant build rate (rate of change of attitude with respect to time) and a discrete time implementation (e.g., discrete time controller), a control law 48 is mathematically expressed as $$\tilde{\omega}(i) = \begin{cases} \frac{x(i) \times x_d}{\|x(i) \times x_d\|} & \text{for } x(i) \neq x_d \\ \tilde{w}(i-1)f & \text{for } x(i) = x_d, i \neq 0 \\ \tilde{\omega}_I & \text{for } x(i) = -x_d \text{ or } x_d \text{ and } i = 0 \end{cases} \quad \text{(Eq. 7)}$$

Given a discrete time system, $x(i+1) = \Gamma(x(i))$, and two invariant sets $J \subseteq I$ with respect to the affine map $\Gamma(x(i))$, it is identified that $\Gamma(x(i))$ is (I, J) stable if $\forall x(0) \in I$, $\exists_{i_0} \geq 0 : x_i \in J$, $\forall i < i_0$. Utilizing control law 48 as expressed in (Eq. 7), the tool system is (I, J) stable, where $\tilde{\omega}_I$ is any unit vector satisfying $\tilde{\omega}_I \cdot x(i) = 0$.

The invariant set I is defined to be the set of all possible attitudes $$I := \{x(i) \in R^3 : \|x(i)\| = 1\} \quad \text{(Eq. 8)}$$

The invariant set J is in the neighborhood of the demand attitude $x_d$ and is $$J \subseteq I := \{x(i) \in I : x(i) \cdot x_d \geq \gamma\} \quad \text{(Eq. 9)}$$

Where the constant $\gamma$ is the scalar advancement in the tools actuation in one time step, that is $$\gamma = x(i) \cdot x(i+1) \quad \text{(Eq. 10)}$$

For a drilling tool, the value of $\gamma$ is usually greater than 0.95; drilling tools often propagate through the ground at a rate of 100 ft/hour or less with curvatures up to 15 deg./100 ft.

The tool face angle, see FIG. 2, is the clockwise difference in angle between the projection of a in the tool face plane and the steering direction in this plane. The tool face angles can be determined from control law, co, see, e.g., block 48 in FIG. 5, by $$\theta_{tf}^a = a\tan2\left(\frac{a \cdot \omega}{x_d \cdot a - (x \cdot x_d)(x \cdot a)}\right) \quad \text{(Eq. 11)}$$

where a is either $-r^G$ ($r^G$ is the gravitational field vector) for the case of gravity tool face or $r^B$ for magnetic tool face ($r^B$ is the magnetic field vector).

Several coordinate transformations are required to implement attitude hold control 46 (FIG. 5). The instantaneous attitude x of BHA 20 may be determined from measurements of the accelerometers and magnetometers, i.e., sensors 40, see, e.g., block 60 of FIG. 5; the demand attitude $x_d$ can be calculated as a unit vector from the demand Euler angles (i.e., $\theta_{inc}^d$, $\theta_{azi}^d$,), see e.g., block 54 of FIG. 5; and a control law tool face angle $\theta_{tf}^a$, is calculated, see, e.g., block 56 of FIG. 5, also referred to herein as an actuation tool face.

The Earth frame, see FIG. 2, is the inertial frame which is fixed and corresponds locally to the geology in which the borehole is being drilled. There are two normalized reference vectors in the Earth frame; the magnetic field vector $r^B$ and the gravitational field vector $r^G$, Accelerometer and magnetometer sensors 40 are located on BHA 20. Accelerometer measurements are identified by $b^G$ and the magnetometer measurements are identified by $b^B$.

The required tool face angle to implement the control laws 48 can be calculated directly according to an embodiment of attitude hold control 46, e.g., Euler direct formulation. It is implemented by evaluating the tool face that is in line with the projection of the demand attitude onto a plane perpendicular to the tool as follows:

$$\theta = \theta_g - \theta_r \quad \text{(Eq. 12)}$$

$$\theta = \theta_m - \theta_r \quad \text{(Eq. 13)}$$

where (Eq. 12) is the control law tool face in gravity tool face ("GTF") and where (Eq. 13) is the control law tool face in magnetic tool face ("MTF"); with:

$$\theta_r = \arctan(b_z^d, b_y^d) \quad \text{(Eq. 14)},$$

where $\theta_r$ is the propagation tool face with respect to the demand attitude, known as a virtual tool face ("VTF");

$$\theta_g = \arctan(b_z^G, b_y^G) \quad \text{(Eq. 15)}$$

where $\theta_g$ is the instantaneous gravity tool face;

$$\theta_m = \arctan(b_z^d, b_y^d) \quad \text{(Eq. 16)}$$

where $\theta_m$ is the instantaneous magnetic tool face; and $$b^d = R_y(\theta_y) R_x(\theta_x) x_d \quad \text{(Eq. 14)}$$

where $x_d$ is the demand attitude vector for the tool, $R_x(\cdot)$ and $R_y(\cdot)$ are defined respectively by equations (Eq. 15) and (Eq. 16) below, and the Euler angles $\theta_y$, $\theta_x$ are obtained from spherical to Cartesian transformation, see block 54 of FIG. 5, followed by Cartesian to spherical transformation, see block 58 of FIG. 5, using appropriate sign conversions. The coordinate transformations may be utilized to remove the ambiguity in the axis and sign of angular rotation for $\theta_{inc}$ as an Euler angle.

$$R_x(\cdot) := \begin{bmatrix} 1 & 0 & 0 \\ 0 & \cos\theta_x & \sin\theta_x \\ 0 & -\sin\theta_x & \cos\theta_x \end{bmatrix} \quad \text{(Eq. 15)}$$

$$R_y(\cdot) := \begin{bmatrix} \cos\theta_y & 0 & -\sin\theta_y \\ 0 & 1 & 0 \\ \sin\theta_y & 0 & \cos\theta_y \end{bmatrix} \quad \text{(Eq. 16)}$$

The attitude of the of BHA 20 can be calculated using rotation matrices $$x = R_y(\theta_{inc}) R_x(\theta_{azi}) r^G \quad \text{(Eq. 17)}$$

where $$\theta_{azi} = \arctan\frac{-b_z^B}{b_y^B} \quad \text{(Eq. 18)}$$

$$\theta_{inc} = \arccos\frac{b_x^G}{\|b^G\|} \quad \text{(Eq. 19)}$$

Figure 8:
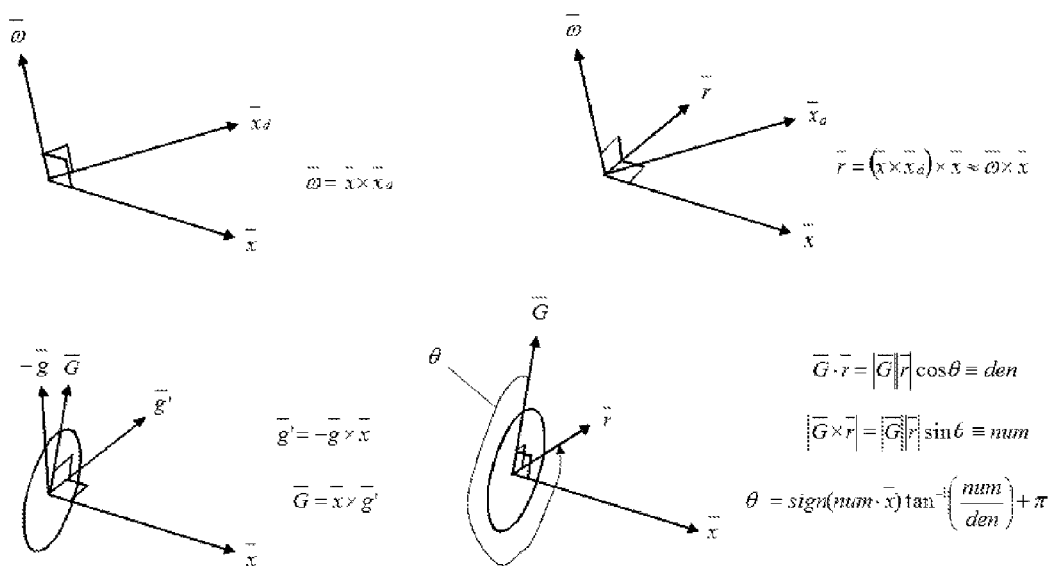
FIG. 8 is a pictorial diagram of a vector based derivation of an equivalent tool face in accordance to one or more embodiments.

According to embodiments, vector geometry can be used to derive the magnetic or gravity tool face values equivalent to the required control law tool face in terms of the demand and instantaneous tool attitude $\bar{x}_d$ and $\bar{x}$ respectively, as shown for example in FIG. 8. Where $\bar{G}$ is the inverse, i.e., pointing up, of the gravity field vector $\bar{g}$ and $\theta$ is the equivalent gravity tool face to the control law tool face. The same derivation shown graphically in FIG. 8 (i.e., vector based derivation of equivalent GTF or MTF to zero virtual tool face) can be arrived at for the equivalent magnetic tool face to the control law tool face by substituting for the magnetic field vector instead of the gravity field vector.

The vector derivation can be implemented directly on the drilling tool according to embodiments by evaluating the expressions shown in equations (Eq. 20) and (Eq. 21) for the instantaneous control law tool face in the equivalent gravity or magnetic tool faces. The instantaneous values of these expressions can then be used as correction factors to convert the instantaneous gravity or magnetic collar position measurements to measurements made with respect to the projection of the demand attitude onto a plane at right angles to the drilling tool. The tool face actuator (e.g., steering device 32) on BHA 20, in order to apply the control law 48 given for example by equation (Eq. 7), applies a zero value tool face demand using for example the demand attitude reference instantaneous collar (e.g., BHA 20) position, also known as the virtual tool face.

With reference to FIGS. 3 and 4, a tool face correction angle φ to convert a control law tool face to an equivalent gravity tool face is expressed as $$\tan\varphi = \frac{\sin(I_t)\sin(A_t - A_x)}{\sin(I_t)\cos(I_x)\cos(A_t - A_x) - \sin(I_x)\cos(I_t)} \quad \text{(Eq. 20)}$$

The tool face correction angle φ to convert a control law tool face to equivalent magnetic tool face is expressed as $$\tan\varphi = \frac{(\cos(\lambda)[\cos(I_x)\sin(I_t)\sin(A_t) - \cos(I_t)\sin(I_x)\sin(A_x)] - \sin(\lambda)[\sin(I_x)\sin(I_t)\sin(A_t - A_x)])}{\left(\begin{array}{c}\cos(\lambda)[\sin(I_t)\cos(A_t) - \sin(I_x)\cos(A_x)[\sin(I_t)\sin(I_x)\cos(A_t - A_x) + \cos(I_t)\cos(I_x)]] - \\ \sin(\lambda)[\sin(I_x)\sin(I_t)\cos(I_x)\cos(A_t - A_x) - \sin^2(I_x)\cos(I_t)]\end{array}\right)} \quad \text{(Eq. 21)}$$

where φ is the MTF or GTF tool face correction angle; φ is the angle between a reference vector and a target attitude vector (see, FIG. 4); $A_t$ is the target azimuth; $I_t$ is the target inclination; $A_x$ is the instantaneous tool azimuth; $I_x$ is the instantaneous tool inclination; and λ is the magnetic field dip angle.

Figure 9:
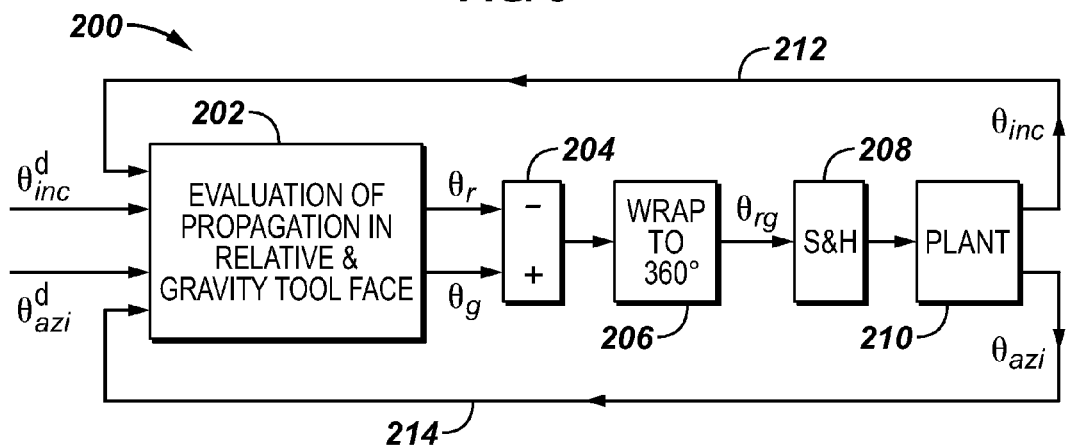
FIG. 9 is a pictorial diagram of a zero relative tool face based directional drilling attitude control architecture in accordance to one or more embodiments.

FIG. 9 schematically illustrates a top level architecture 200 according to one or more embodiments. In block 202, evaluation of relative propagation and gravity tool faces is performed. The result provides a propagation tool face with reference to the gravity reference vector and a relative propagation tool face with respect to demand attitude reference vector. These values are evaluated in block 204 which are wrapped to 360 degrees providing a zero relative tool face in equivalent gravity tool face in block 206. This value is evaluated in block 208 and the output is communicated to block 210. A set of two feedback loops 212, 214 are provided.

According to embodiments it can be seen that to evaluate the relative and gravity tool faces, that it may only be necessary to use the instantaneous tool inclination and tool azimuth measurements, i.e., sensor 40 measurements, and know the demand tool inclination and tool azimuth. Hence, the hold attitude control may be implemented entirely autonomously downhole (e.g., attitude hold controller 36). In addition, embodiments of the method can be used to evaluate the tool face of the tool's propagation with respect to any other reference vector so long as the reference vector coordinates are known in the global reference frame. For example, the tool's gravity or magnetic tool face values for the direction of propagation can be obtained using the inverse of the gravity or the magnetic field (the dip and declination angles are known and constant for a given location) vectors respectively instead of the demand attitude vector.

For strap down tools, for example, drilling parallel to the gravity or magnetic field vectors (vertical or zone and exclusion drilling respectively) is problematic because the radial sensors used for tool face measurements have poor signal to noise ratios and it is difficult to filter out the collar revolutions per minute component without introducing lags. The virtual sensor embodiment described above, for example, can provide a method for drilling parallel to gravity or magnetic field vectors.

According to an embodiment, a virtual sensor approach provides a method to evaluate the geostationary tool face of tool propagation from the continuous azimuth and inclination measurements. Accordingly, it is a matter of utilizing the virtual tool face of propagation as the feedback geostationary angular position measurement as opposed to the geostationary angular tool face measurement of the actuator (rotary valve or point-the-bit mandrel). This is an attractive method as in reality the geostationary tool face of the propagated hole is the feature that the driller is interested in, not the geostationary tool face of the actuator. Tool face control architecture has an inner fast velocity regulating feedback loop and a slower outer tool face tracking feedback loop. According to embodiments herein, the virtual geostationary tool face measurement can be utilized for the outer slow angular position feedback loop.

In accordance with embodiments, for positive displacement and high pressure and high temperature situations, the open loop plant used for off line design can be taken as that of a rotary valve, the assumption being that there are minimal dynamics between the rotary valve and the net resultant force vector from the actuator. Therefore, for positive displacement and high pressure and high temperature the off line control design of the slow outer position loop and fast inner velocity loop will be unaltered from that used when the geostationary tool face of the rotary valve is used as the feedback signal. For certain drilling systems, the first order lag of the steering sleeve tool face response can be used as the dominant open loop plant dynamics and therefore a simple PID or PI feedback control law can be used to close the loop on the tool's propagation tool face.

Embodiments can be utilized for drilling when the tool is not anywhere near parallel to the reference field vector as well. This is also an attractive method as there is not a need to provide hardware or signal conditioning necessary to evaluate the geostationary tool face of the rotary valve or mandrel. Hence according to some embodiments, the methods enable drilling parallel to the reference field vector and provide a more direct feedback measurement of the propagation tool face, and may also simplify and strip out cost from the drilling tool's architecture.

According to embodiments, control laws 48 are applied to an arbitrary demand attitude. For example, the attitude hold controller recursively applies the actuator tool face in the direction of the projection of the reference vector onto the steering plane, for example a zero reference or virtual tool face. Accordingly, attitude hold controller 36 action has the effect of regulating the relative inclination (inclination defined using conventional systems but with respect to the referenced demand vector) to zero.

Figure 10:
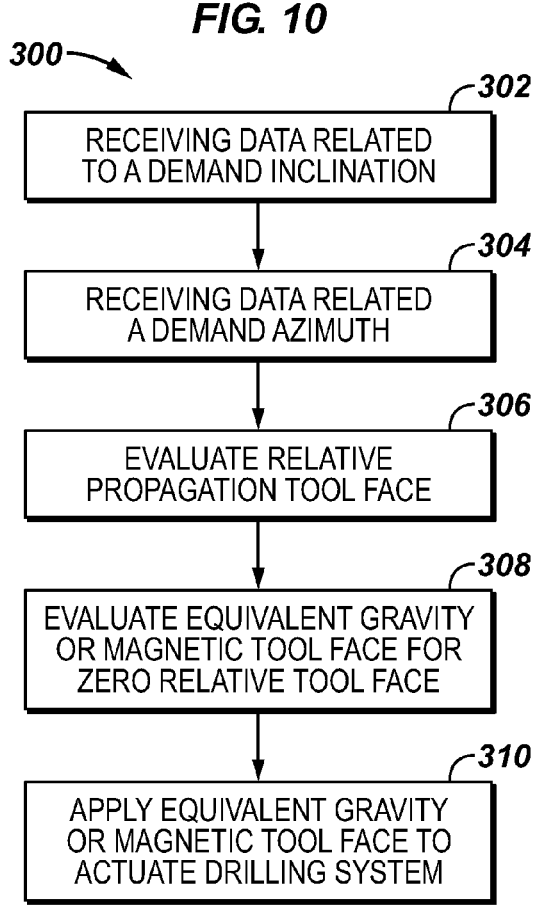
FIG. 10 is a pictorial diagram of a method in accordance to one or more embodiments.

A directional drilling attitude hold control embodiment 300 is now described with reference to FIG. 10. Referring also to FIGS. 1-9, at block 302 data related to at least a demand inclination with respect to a global coordinate system is received by attitude hold controller 36 (i.e., processor 38). At block 304 data related to at least a demand azimuth with respect to a global coordinate system is received by attitude hold controller 36. Evaluating the relative propagation tool face of the drilling tool in response to receiving the demand inclination and demand azimuth data is performed at block 306. For example, the evaluating performed downhole at attitude hold controller 36. Evaluating an equivalent gravity or magnetic tool face for a zero relative tool face is performed at block 308. The equivalent gravity or magnetic tool face is applied with the actuated drilling system at block 310. For example, steering device 32 is operated to direct the drill bit along the desired attitude in response to applying the equivalent tool face. Again, steering device 32 may be a rotary steering device or a non-rotary steering device.

Figure 11:
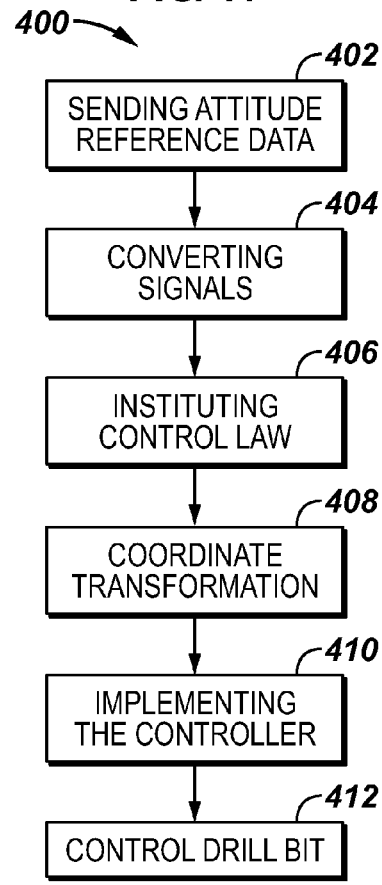
FIG. 11 is a pictorial diagram of a method in accordance to one or more embodiments.

A method embodiment 400 depicted in FIG. 11 is now described with reference also to FIGS. 1-10. Sending attitude reference data to BHA 20 (e.g., controller 36) at block 402. At block 404, receiving the sent attitude reference data and converting the attitude reference data into a vector unit in vector space representing a drill attitude for example. Instituting, at block 406, a control law 48 to stabilize the drill attitude and to drive the drilling tool (i.e., BHA 20) to a set point. Performing a coordinate transformation to implement a controller at block 408 and implementing the controller at block 410. Controlling the drill bit in response to implementing the controller is performed at block 412. According to some embodiments, attitude hold controller 36 may be one of a strap down control unit and a roll stabilized control unit.

The attitude reference data, i.e., signals, may be an inclination and an azimuth set point of a drilling tool orientation. Evaluating the gravity and or the magnetic tool face that is equivalent to a zero relative tool may include evaluating an angular direction of an arbitrary globally referenced vector projected onto a plane at right angles to a tool face.

In accordance with an embodiment, the evaluated gravity and or magnetic tool face can be applied over discrete intervals of time during the controlling the drill bit until a tool attitude tracks a demand attitude.

In accordance with one or more embodiments, a tool attitude is controlled in a zone of exclusion. In accordance to some embodiments, the tool attitude is controlled while drilling the borehole vertically.

The foregoing outlines features of several embodiments of directional drilling attitude hold controller devices, systems, and methods so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method, comprising:

sending attitude reference data to a controller disposed with a drilling tool;

converting the attitude reference data into a vector unit in vector space representing a drill attitude;

instituting a control law to stabilize the drill attitude and to drive the drill attitude to a set point;

performing a coordinate transformation for implementing a controller, comprising evaluating one of a gravity and a magnetic tool face that is equivalent to a zero relative tool face, wherein an angular direction of an arbitrary globally referenced vector is projected onto a plane at right angles to a tool face;

implementing the controller; and controlling an instantaneous attitude of the drilling tool in response to implementing the controller.

2. The method of claim 1, wherein the attitude reference data comprises an inclination and an azimuth angle set point.

3. The method of claim 1, further comprising recursively applying the one of the evaluated gravity tool face and the magnetic tool face during the controlling the instantaneous drilling tool attitude.

4. The method of claim 1, further comprising recursively applying the one of the evaluated gravity tool face and the magnetic tool face over discrete time intervals during the controlling the instantaneous attitude of the drilling tool until the instantaneous drilling tool attitude tracks a demand attitude.

5. The method of claim 1, further comprising sending to the controller attitude data representing the instantaneous drilling tool attitude.

6. The method of claim 1, wherein the instantaneous drilling tool attitude is one of a zone of exclusion and drilling vertically.

7. The method of claim 1, wherein the control law is a time varying response of the drilling tool represented as:

$$\dot{x} = \omega \times x$$

where x is a unit vector representing the drill attitude and $\omega$ is an angular velocity vector parameter.

8. The method of claim 1, wherein the control law is $$\omega = k x \times x_d$$

where $\omega$ is an angular velocity vector parameter, k is a variable build-rate of the drill attitude, x is a unit vector representing the drill attitude, and $x_d$ is a demand attitude.

9. The method of claim 1, wherein the control law is $$\omega = \begin{cases} K \dfrac{x \times x_d}{\|x \times x_d\|} & \text{for } x \neq x_d \\ 0 & \text{for } x = x_{d1} \end{cases}$$

where $\omega$ is an angular velocity vector parameter, K is constant build-rate of the drill attitude, x is a unit vector representing the drill attitude, and $x_d$ is a demand attitude.

10. The method of claim 1, wherein the control law is $$\tilde{\omega}(i) = \begin{cases} \frac{x(i) \times x_d}{\|x(i) \times x_d\|} & \text{for } x(i) \neq x_d \\ \tilde{w}(i-1)f & \text{for } x(i) = x_d, i \neq 0 \\ \tilde{\omega}_l & \text{for } x(i) = -x_d \text{ or } x_d \text{ and } i = 0 \end{cases}$$

where $\tilde{\omega}$ is the actuation velocity vector, x is a unit vector representing the drill attitude, and $x_d$ is a demand attitude.

11. The method of claim 1, wherein the controlling the instantaneous drilling tool attitude comprises transmitting a steering direction to the drilling tool.

12. A method, comprising:
receiving at a navigable apparatus a demand inclination and a demand azimuth with respect to a global coordinate system;
determining at the navigable apparatus a demand attitude vector according to the received demand inclination and the demand azimuth;
determining at the navigable apparatus an instantaneous navigable apparatus attitude vector;
evaluating a control law using the instantaneous navigable apparatus vector and the navigable apparatus demand attitude to derive a control law tool face;
converting the control law tool face to an equivalent tool face; and
applying the equivalent tool face with the navigable apparatus to control the navigable apparatus.

13. The method of claim 12, wherein the equivalent tool face is one of an equivalent gravity tool face and an equivalent magnetic tool face.

14. The method of claim 12, wherein the navigable apparatus is a drilling tool comprising a control unit receiving the demand inclination and the demand azimuth, wherein the control unit is one of a roll stabilized control unit and a strap down control unit.

15. The method of claim 12, wherein the instantaneous navigable apparatus attitude is vertical in a global coordinate system.

16. The method of claim 12, wherein applying the equivalent tool face comprises recursively applying the equivalent tool face over discrete time intervals.

17. The method of claim 12, wherein the control law is one selected from the group of:
(a) a time varying response of the drilling tool represented as:

$$\dot{x} = \omega \times x$$

where x is a unit vector representing the drill attitude and $\omega$ is an angular velocity vector parameter;

(b)

$$\omega = k x \times x_d$$

where $\omega$ is an angular velocity vector parameter, k is a variable build-rate of the drill attitude, x is a unit vector representing the drill attitude, and $x_d$ is a demand attitude;

(c)

$$\omega = \begin{cases} K \frac{x \times x_d}{\|x \times x_d\|} & \text{for } x \neq x_d \\ 0 & \text{for } x = x_{d1} \end{cases}$$

where $\omega$ is an angular velocity vector parameter, K is constant build-rate of the drill attitude, x is a unit vector representing the drill attitude, and $x_d$ is a demand attitude; and (d)

$$\tilde{\omega}(i) = \begin{cases} \frac{x(i) \times x_d}{\|x(i) \times x_d\|} & \text{for } x(i) \neq x_d \\ \tilde{w}(i-1)f & \text{for } x(i) = x_d, i \neq 0 \\ \tilde{\omega}_l & \text{for } x(i) = -x_d \text{ or } x_d \text{ and } i = 0 \end{cases}$$

where $\tilde{\omega}$ is the actuation velocity vector, x is a unit vector representing the drill attitude, and $x_d$ is a demand attitude.

18. A method, comprising:
determining at a drilling tool a demand attitude;
determining at the drilling tool an instantaneous drilling tool attitude;
evaluating a control law using the instantaneous drilling tool attitude and the drilling tool demand attitude to derive a control law tool face;
converting the control law tool face to an equivalent tool face; and
applying the equivalent tool face with the drilling tool to control the drilling tool attitude:
wherein the control law is $$\tilde{\omega}(i) = \begin{cases} \frac{x(i) \times x_d}{\|x(i) \times x_d\|} & \text{for } x(i) \neq x_d \\ \tilde{w}(i-1)f & \text{for } x(i) = x_d, i \neq 0 \\ \tilde{\omega}_l & \text{for } x(i) = -x_d \text{ or } x_d \text{ and } i = 0 \end{cases}$$

where $\tilde{\omega}$ is the actuation velocity vector, x is a unit vector representing the drilling tool attitude, and $x_d$ is a demand attitude.

19. The method of claim 18, wherein the instantaneous drilling tool attitude is one of a zone of exclusion and drilling vertically.

20. A method, comprising:
sending attitude reference data to a controller disposed with a drilling tool;
converting the attitude reference data into a vector unit in vector space representing a drill attitude;
instituting a control law to stabilize the drill attitude and to drive the drill attitude to a set point;
performing a coordinate transformation for implementing a controller;
implementing the controller; and
controlling an instantaneous attitude of the drilling tool in response to implementing the controller;

wherein the control law is one selected from the group of:

(a) a time varying response of the drilling tool represented as:

$$\dot{\omega} = \omega \times x$$

where x is a unit vector representing the drill attitude and ω is an angular velocity vector parameter;

(b)

$$\omega = kx \times x_d$$

where ω is an angular velocity vector parameter, k is a variable build-rate of the drill attitude, x is a unit vector representing the drill attitude, and $x_d$ is a demand attitude;

(c)

$$\omega = \begin{cases} K \dfrac{x \times x_d}{\|x \times x_d\|} & \text{for } x \neq x_d \\ 0 & \text{for } x = x_{d1} \end{cases}$$

where ω is an angular velocity vector parameter, K is constant build-rate of the drill attitude, x is a unit vector representing the drill attitude, and $x_d$ is a demand attitude; and (d)

$$\tilde{\omega}(i) = \begin{cases} \dfrac{x(i) \times x_d}{\|x(i) \times x_d\|} & \text{for } x(i) \neq x_d \\ \tilde{w}(i-1)f & \text{for } x(i) = x_d, i \neq 0 \\ \tilde{\omega}_I & \text{for } x(i) = -x_d \text{ or } x_d \text{ and } i = 0 \end{cases}$$

where $\tilde{\omega}$ is the actuation velocity vector, x is a unit vector representing the drill attitude, and $x_d$ is a demand attitude.

* * * * *